(12) United States Patent
Sundrani et al.

(10) Patent No.: US 8,090,992 B2
(45) Date of Patent: Jan. 3, 2012

(54) HANDLING OF CLUSTERED MEDIA ERRORS IN RAID ENVIRONMENT

(75) Inventors: Kapil Sundrani, Uttar Pradesh (IN); Anant Baderdinni, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 328 days.

(21) Appl. No.: 12/179,736

(22) Filed: Jul. 25, 2008

(65) Prior Publication Data
US 2010/0023814 A1    Jan. 28, 2010

(51) Int. Cl.
*G06F 11/00* (2006.01)
(52) U.S. Cl. ............ 714/42; 714/6.1
(58) Field of Classification Search ......... 714/6, 8, 714/42, 55
See application file for complete search history.

(56) References Cited

U.S. PATENT DOCUMENTS

| | | | | |
|---|---|---|---|---|
| 6,049,891 | A * | 4/2000 | Inamoto | 714/6 |
| 7,003,689 | B2 * | 2/2006 | Arakawa | 714/8 |
| 7,389,396 | B1 * | 6/2008 | Goel et al. | 711/167 |
| 2003/0133384 | A1 * | 7/2003 | Yada et al. | 369/53.45 |
| 2005/0216782 | A1 * | 9/2005 | Saitoh | 714/2 |
| 2006/0026347 | A1 * | 2/2006 | Hung | 711/114 |
| 2006/0085595 | A1 * | 4/2006 | Slater | 711/114 |
| 2007/0036055 | A1 * | 2/2007 | Ito | 369/53.35 |
| 2007/0038830 | A1 * | 2/2007 | Iwamitsu et al. | 711/167 |

* cited by examiner

*Primary Examiner* — Yolanda L Wilson
(74) *Attorney, Agent, or Firm* — Raj Abhyanker, P.C.

(57) ABSTRACT

A method, apparatus, and system of improved handling of clustered media errors in raid environment are disclosed. In one embodiment, a method includes starting a command timer when a firmware accepts a command from a host, tracking an amount of time the command spends on handling of a clustered media error through the command timer, and stopping the command timer when at least one of the command is completed and a time limit expires. The method may complete a read as a success when a host IO is a read command. The method may complete a write as a success, after writing parity, and data when the host IO may be a write command.

20 Claims, 10 Drawing Sheets

HANDLING OF CLUSTERED MEDIA ERRORS IN RAID ENVIRONMENT

FIELD OF TECHNOLOGY

This disclosure relates generally to an enterprise method, a technical field of software and/or hardware technology and, in one example embodiment, to improved handling of clustered media errors in raid environment.

BACKGROUND

Availability of data on a storage device may be important for an application (e.g., a banking application, a communication application, etc.) and/or an operating system (e.g., Microsoft Windows®, Linux®, Sun Solaris®, etc.) during a critical operation (e.g., a read operation, a write operation, etc.) associated with a field of use (e.g., a medical use, a banking use, etc.). In some cases, the data on the storage device (e.g., a hard drive, tape drive, etc.) may not be available (e.g., due to improper handling, aging, errors, etc.). In other cases, the data may be lost. Even when a data recovery is possible, the data recovery may take a long period of time and/or may depend on various factors (e.g., such as time, kind of errors, technology, etc.). In many cases, the data recovery may not work.

A Clustered Media Error (CME) may refer to a set to physically contiguous and/or closely located set of media errors (e.g., errors based on access of physical media such as a magnetic film of the hard drive, etc.) in a storage device. Handling of the CME may require a complex design of a storage system (e.g., a RAID system) containing the storage device. A recovery of data on the storage device exhibiting the CME may need time to be computed again (recreated from the redundant data). The application and/or the operating system may not have sufficient time to wait for recovery of the storage device of the CME while it is waiting for the IO request to be serviced by the storage system. For example, the operating system or the application may have a threshold time (e.g., one minute) for an IO request to be serviced by the storage system. If the storage device does not to respond (e.g., to communicate the information which was expected) in a threshold time, consequences may be unexpected and undesirable (e.g., an operating system crash, a device failure, an application crash, etc.).

As a result, the remaining data of the storage device may not be accessible when the storage device is disabled. Furthermore, a disablement of the storage device may have consequences on the application, the operating system and/or the storage device. For example, if the application and/or the operating system are located on a same storage device, the operating system and/or the application may crash (e.g. an incident where a system of a computer ceases to respond). Similarly, when the operating system is running on other storage devices, and the application is accessed on the storage device that is being disabled, the operating system may crash. If the storage device is a data center/server, then all data at the data center/server location may be lost. Furthermore, any hardware that is dependent on the application and/or operating system may also fail. Loss of the data, the storage device, the application, and/or the operating system may be expensive and may adversely affect the availability of the data of the storage device.

SUMMARY

A method, apparatus, and system of improved handling of clustered media errors in raid environment are disclosed. In one aspect, a method includes starting a command timer when a firmware accepts a command from a host, tracking an amount of time the command spends on handling of a clustered media error through the command timer, and stopping the command timer when at least one of the command is completed and a time limit expires.

The clustered media error may occur when there errors across a number of contiguous blocks on a physical storage device such that a processing time for the clustered media error exceeds a threshold time. The time limit of the command timer may be a sum total of a time it takes to read the clustered media error and/or another time to recover the media error by reading one peer drive. The command timer may be used instead of a threshold number of clustered media errors because the command timer addresses different recovery times of different drives. The command timer may be a sum of a read timer and a recovery timer. When all drives are running, a logical volume may be in an optimal state. When less than all drives are running, the logical volume may be in a partially degraded state and/or a completely degraded state. When a logical volume is in the optimal state, recovery for an I/O span may be started by reading a peer drive(s) on an affected strip and then correcting a strip having the clustered media error.

The method may include completing a read as a success when a host IO is a read command when the command timer is within a threshold limit. The method may complete a write as a success, after writing parity and/or data when the host IO may be a write command when the command timer is within the threshold limit. The method may recover the requested data using one peer drive (e.g., when the read timer expires) when the logical volume is in an optimal state and/or in partially degraded state.

The method may include completing the read as a failure when the command timer expires. The method may puncture an entire span of host write on a parity drive, write a host data on a data drive(s), and complete the write as a success when the host IO is a write command on a write through logical volume (e.g., when the command timer expires). The method may keep a dirty cache line as dirty and correct the clustered media errors currently accessed until the dirty cache line may be flushed in a following flush cycle when the host IO is a write command on a write back logical volume, the logical volume may be in the optimal state and/or partially degraded state (e.g., when the command timer expires).

The method may puncture the entire span of host write on the parity drive and/or write the host data on the data drive(s) when the host IO may be a write command on a write back logical volume, the logical volume may be in the completely degraded state (e.g., when the command timer expires).

The method may recover a requested data from one peer drive (e.g., when the read timer may expire and the command timer is within a total threshold time including the read timer and the recovery timer) when a logical volume may be in an optimal state and/or a partially degraded state. The method may correct a strip having the clustered media error. The method may also complete the host read as a success when the command timer is within a threshold limit. In addition, the method may read until the recovery time limit expires even when an additional media error may be encountered on one peer drive. The method may yet complete the host read as a success when recovery completes successfully. The method may fail a host read if the time limit expires when a logical volume is in a completely degraded state.

The method may include encountering the clustered media error while reading peer arms for generating a parity during a host write. The method may determine that the time limit for read has expired. The method may recover an entire span of data on a strip by reading peer drives when a logical volume is an optimal state and/or a partially degraded state, and/or when a clustered media error may be encountered for write command on a write through logical volume.

The method may correct the strip having the clustered media error. The method may complete the write through write command as a success. The method may continue with reads and/or recover as much data as possible before the recovery timer expires if another media error may be encountered on the peer drives. The method may puncture an unrecoverable portion of the strip having the clustered media error and/or complete the host write as a success. The method may also puncture the entire span of strip having the clustered media error if the command timer expires and complete the host write as a success.

The method may include encountering the clustered media error while reading peer arms for generating a parity during a host write. In addition, the method may determine that a read timer has expired. The method may recover an entire span of data on a strip by reading peer drives when a logical volume may not be in a completely degraded state, and/or when a clustered media error may be encountered for a write command on a write back logical volume. The method may correct the strip having the clustered media error. The method may continue with reads and/or recover as much data as possible before the recovery timer expires if another media error may be encountered on the peer drives. The method may include recovering as many media errors as possible and/or maintain the dirty data in the cache line and reissue the delayed write command in a following flush cycle so that there will be a fewer number of media errors to recover from and success may occur on a next host write (e.g., when the command timer expires). The method may puncture the entire portion of the strip including the clustered media errors and complete the write back write command as a success when a logical volume is in a completely degraded state.

In another aspect, a system includes a timer module to start a command timer when a firmware accepts a command from a host, a track module to track an amount of time the command spends on handling of a clustered media error through the command timer, and a expiration module to stop the command timer when at least one of the command is completed and a time limit expires.

The clustered media error may occur when there are errors across a number of contiguous blocks on a physical storage device. The time limit of the command timer may be a sum total of a time it takes to read the clustered media error and another time to recover the media error by reading one peer drive. The command timer may be used instead of a threshold number of clustered media errors because the command timer addresses different recovery times of different drives.

In yet another aspect, a machine-readable medium embodying a set of instructions that, when executed by a machine, causes the machine to perform the method includes starting a command timer when a firmware accepts a command from a host, tracking an amount of time the command spends on handling of a clustered media error through the command timer, and stopping the command timer when at least one of the command is completed and a time limit expires.

The clustered media error may occur when there are errors across a number of contiguous blocks on a physical storage device. The time limit of the command timer may be a sum total of a time it takes to read the clustered media error and another time to recover the media error by reading one peer drive.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and system of improved handling of clustered media errors in RAID environment are disclosed. Although the present embodiments have been described with reference to specific example embodiments, it will be evident that various modifications and changes may be made to these embodiments without departing from the broader spirit and scope of the various embodiments.

Figure 2:
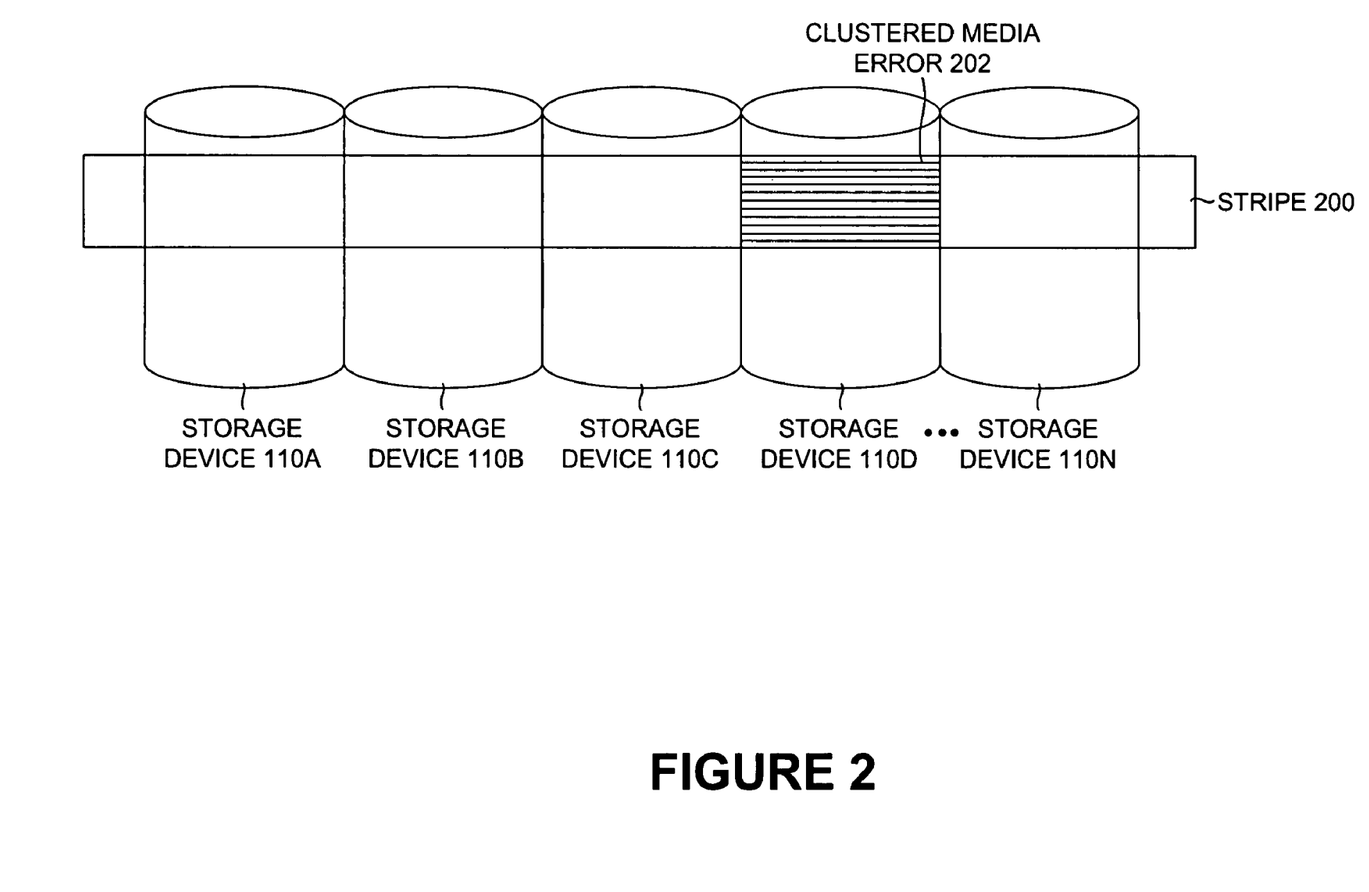
FIG. 2 is a systematic view of logical drive illustrating series of storage devices including a strip that may have clustered media errors, according to one embodiment
Figure 3:
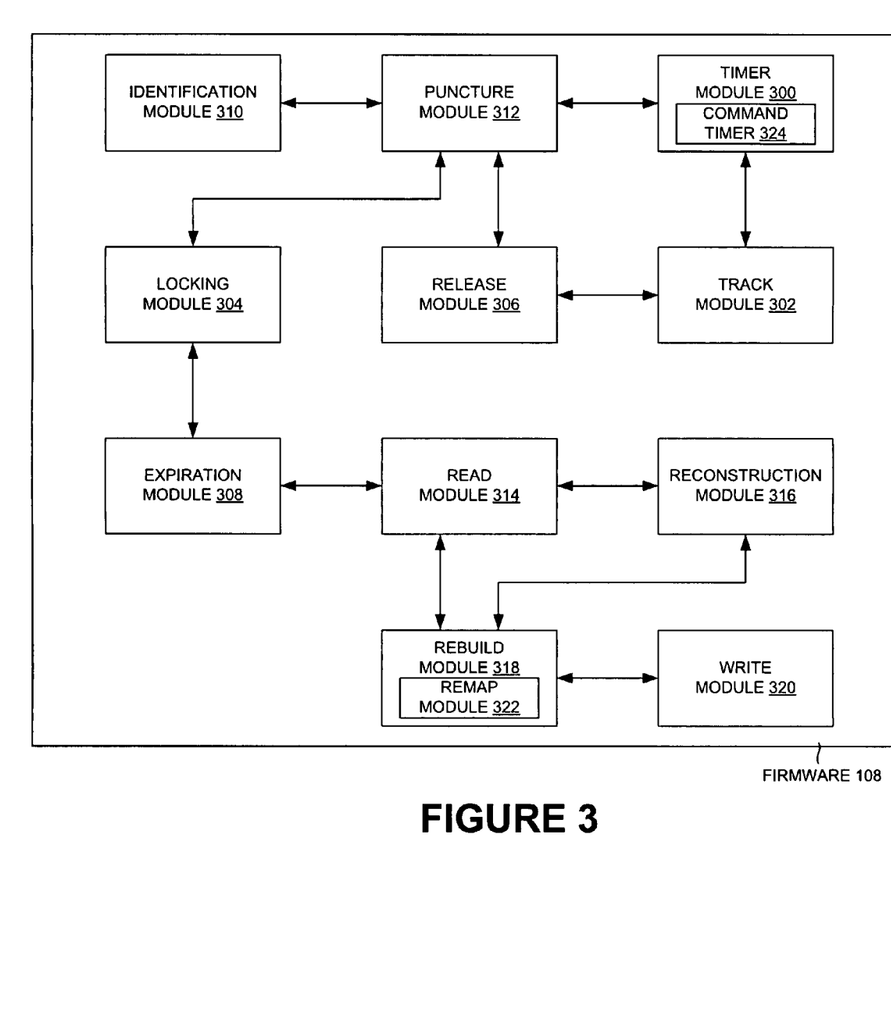
FIG. 3 is an exploded view of the firmware of FIG. 1, according to one embodiment.

In one embodiment, a method includes starting a command timer (e.g., the command timer 324 of FIG. 3) when a firmware (e.g., the firmware 108 of FIG. 1) accepts a command from a host (e.g., using the timer module 300 of FIG. 3), tracking an amount of time the command spends on handling of a clustered media error (e.g., the clustered media error 202 of FIG. 2) through the command timer 324 (e.g., the track module 302 of FIG. 3), and stopping the command timer when the command is completed and a time limit expires (e.g., using the expiration module 308 of FIG. 3).

In another embodiment, a system includes a timer module (e.g., the timer module 300 of FIG. 3) to start a command timer (e.g., the command timer 324 of FIG. 3) when a firmware (e.g., the firmware 108 of FIG. 1) accepts a command from a host, a track module (e.g., the track module 302 of FIG. 3) to track an amount of time the command spends on handling of a clustered media error (e.g., the clustered media error 202 of FIG. 2) through the command timer 324, and an expiration module (e.g., the expiration module 308 of FIG. 3) to stop the command timer 324 when the command is completed and a time limit expires.

In yet another embodiment, a machine-readable medium embodying a set of instructions that, when executed by a machine, causes the machine to perform the method includes starting a command timer (e.g., the command timer 324 of FIG. 3) when a firmware (e.g., the firmware 108 of FIG. 1) accepts a command from a host, tracking an amount of time the command spends on handling of a clustered media error (e.g., the clustered media error 202 of FIG. 2) through the command timer 324, and stopping the command timer 324 when the command is completed and a time limit expires.

Figure 1:
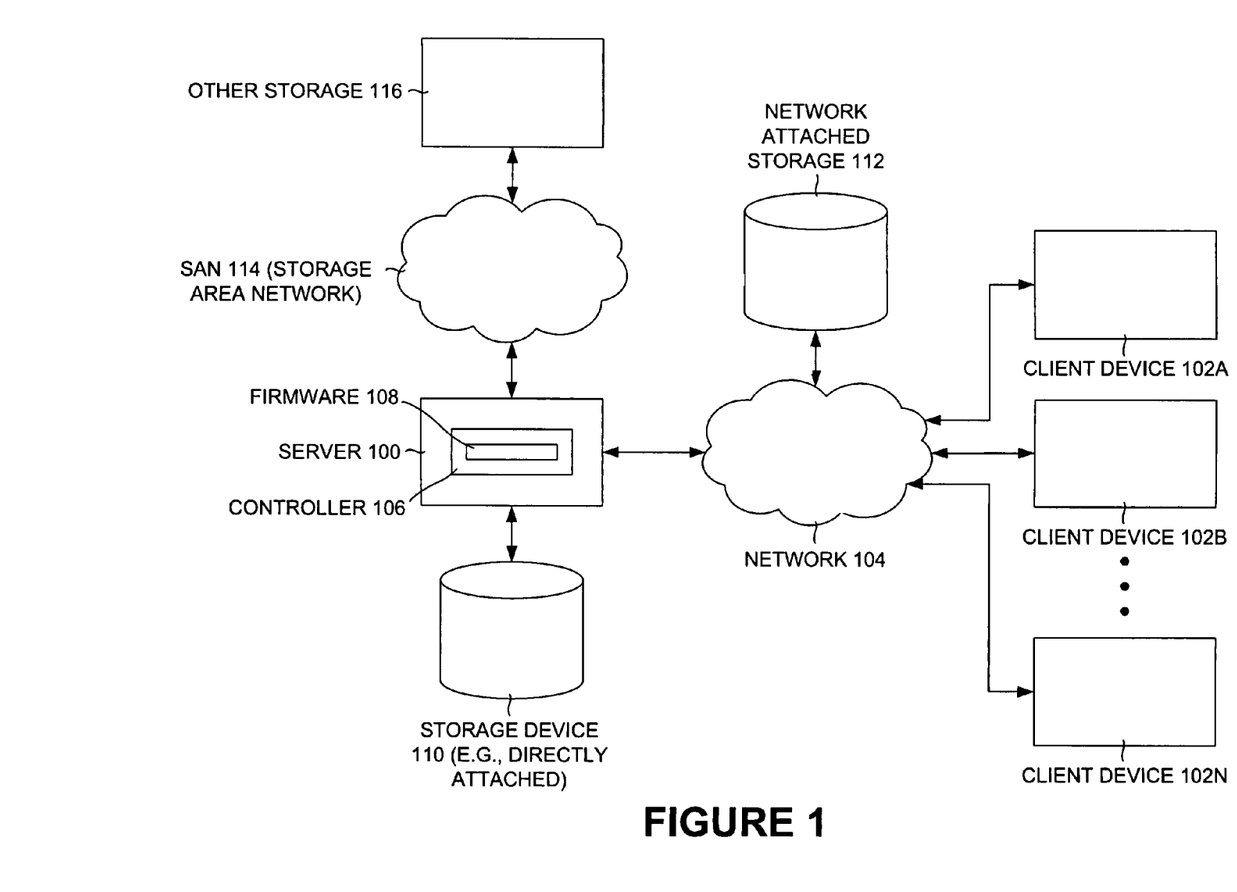
FIG. 1 is a system view illustrating a server that may communicate with a storage device, other storage device, and/or client devices through a network, according to one embodiment.

FIG. 1 is a system view illustrating a server (e.g., the server 100 of FIG. 1) that may communicate with a storage device (e.g., the storage device 110 (e.g., directly attached) of FIG. 1), other storage device, and/or client devices through a network, according to one embodiment. Particularly, FIG. 1 illustrates a server 100, a client device 102A-N, a network 104, a controller 106, a firmware 108, a storage device 110 (e.g., directly attached), a network attached storage 112, SAN 114 (Storage Area Network), and other storage 116, according to one embodiment.

The server 100 (e.g., World Wide Web server, etc.) may be a data processing system (e.g., may be a part of client-server protocol) that may run on a network (e.g., network 104 of FIG. 1) and may respond to requests submitted by the client (e.g., client device 102A-N of FIG. 1). The client device 102A-N may be a data processing system (e.g., the computer, the mobile device, etc.) that may request (e.g., access) for a service (e.g., may send request for some service) to another computer system (e.g., may be the server 100 of FIG. 1) on the network 104. The network 104 may be a group of stations (e.g., computers, telephones, etc.) that may be connected (e.g., may be through wire, wireless, etc.) by communication facilities (e.g., internet, etc.) for exchanging information between the data processing units (e.g., the server 100, the client device 102A-N, the storage device 110, etc.).

The controller 106 may be an electronic device that may interface between the data collection devices (e.g., may be storage device 110, other storage 116, etc.) and the host (e.g., may be client device 102A-N of FIG. 1) to manage operations (e.g., read, write, etc.) and its communication. The firmware 108 may be a computer program (e.g., set of instructions, etc.) that may be embedded in device (e.g., the controller, etc.) to take into consideration the broader implications of failures and/or the resultant affect on getting to the data from the storage device 110. The storage device 110 (e.g., may be directly attached to the storage device as illustrated in FIG. 1) may be a memory device (e.g., the computer, the hard disk, a server, etc.) that may be used to process (e.g., hold, enable read, write, etc.) the information (e.g., may provide protection against data loss due to disk drive failure, etc.).

The network attached storage 112 may be the memory device (e.g., the computer, the hard disk, etc.) that may be used (e.g., may be in the network) to process (e.g., hold, communicate, etc.) the data that may be communicated in the network 104 (e.g., may be through internet). The SAN 114 (Storage Area Network) may be a dedicated, high-speed network that may establish a direct connection between storage elements (e.g., the storage device 110, the server 100, etc.) to allow scalability to various nodes (e.g., the client device 102A-N). The other storage 116 may be a memory device (e.g., the computer, the hard disk, etc.) indirectly connected to the network 104 that may be used to process (e.g., hold) the information that that may be communicated through the SAN 114.

In example embodiment, the server 100 may include the controller 106. The controller 106 may include the firmware 108. The server 100 may communicate with SAN 114 (Storage Area Network), the storage device 110 (e.g., directly attached) and other storage 116. The network 104 may enable the client device 102A-N to communicate with the server and other devices. The network 104 may enable communication with network attached storage 112 and the server 100.

FIG. 2 is a systematic view of logical drive illustrating series of storage devices including a strip (e.g., the strip 200 of FIG. 2) that may have clustered media errors, according to one embodiment. Particularly, FIG. 2 illustrates the storage device 110A-N, a strip 200, and a clustered media error 202, according to one embodiment.

The strip 200 may be a set of memory locations (e.g., the memory sectors) in the storage device (e.g., the hard disk, etc.) located in the redundant array of inexpensive drives (e.g., as illustrated in FIG. 2). The clustered media error (CME) 202 may refer to a set to physically contiguous and/or closely located set of media errors in any storage device (e.g., errors based on access of physical media such as a magnetic film of the hard drive, etc.).

In example embodiment, the logical drive may include a set of storage devices (e.g., the storage device 110A-N). The storage device 110A-N may include the memory locations that may be grouped into the strips (e.g., like the strip 200 as illustrated in FIG. 2). The strip 200 may include the memory location where the clustered media error 202 may occur.

In one embodiment, the clustered media error 202 may occur when there are errors across the threshold number of contiguous blocks on the physical storage device such that the processing time for the clustered media error 202 may exceed the threshold timer. The time limit of the command timer 324 may be the sum total of the time it takes to read the clustered media error 202 and another time to recover the media error by reading one peer drive. The command timer 324 may be used instead of the threshold number of clustered media errors because the command timer 324 addresses different recovery times of different drives. The command timer 324 may be sum of the read timer and the recovery timer. When all drives are running, the logical volume may be in an optimal state. When less than all drives are running, the logical volume may be in the partially degraded state and the completely degraded state. When the logical volume may be in the optimal state, recovery for the I/O span may be started by reading the peer drive(s) on the affected strip and then the strip 200 having the clustered media error 202 may be corrected. The clustered media error 202 may occur when there are errors across the threshold number of contiguous blocks on the physical storage device (e.g., may be the storage device 110A-N and the other storage 116 of FIG. 2).

FIG. 3 is an exploded view of the firmware 108 of FIG. 1, according to one embodiment. Particularly, FIG. 3 illustrates a timer module 300, a track module 302, a locking module 304, a release module 306, an expiration module 308, an identification module 310, a puncture module 312, a read module 314, a reconstruction module 316, a rebuild module 318, a write module 320, a remap module 322, and a command timer 324, according to one embodiment.

The timer module 300 may monitor (e.g., start, stop, etc.) a timer (e.g., the command timer 324 to keep a track of time) when the firmware 108 processes (e.g., accepts) a command as a success. The track module 302 may keep a track of amount of time (e.g., calculated by the timer module 300) of each command required to spend in handling media errors (e.g., the clustered media error 202). The locking module 304 may lock some of the memory locations (e.g., like the strip 200) such that no operations (e.g., read, write, etc.) can be performed (e.g., on the strip 200). The release module 306 may generate a command (e.g., a release command) which may unlock (e.g., remove the lock on the memory strip) such that the other operations (e.g., read, write, etc.) can be performed (e.g., may be by the operating system, driver, controller, etc.) on the strip 200.

The expiration module 308 may process (e.g., calculate) the expiry time (e.g., run out time, termination time, etc.) for various modules like the timer module 300, etc. (e.g., command timer while reading peer arms for generating the parity, read timer while doing reads for parity generation, etc.). The identification module 310 may identify the media errors (e.g., the clustered media error (CME) 202) which may be present in the strip 200 of the storage device 110 (e.g., the hard disk, the random access memory (RAM), etc.). The puncture module 312 may corrupt (e.g., introduce error, etc.) the checksum in the memory strip that may contain errors (e.g., the clustered media error (CME) 202) in the redundant array of inexpensive drive (e.g., the strip 200). The read module 314 may read the data (e.g., when the read command is issued by the driver, etc.) from the storage device 110A-N (e.g., the strip 200 that may/may not include CME).

The reconstruction module 316 may reconstruct the data (e.g., from the location which may include media errors, etc.) into a different memory location (e.g., that may be internal to the storage device) for restoration of data redundancy which may ensure data availability. The rebuild module 318 may rebuild the data (e.g., when there may be inconsistency in the data present in the storage device (may be during consistency check)) using the existing data (e.g., that may include the original data, the parity data, etc.). The write module 320 may write the data (e.g., when the write command may be issued by the driver, etc.) from the storage device 110 (e.g., the strip 200 that may/may not include CME). The remap module 322 may remap the existing memory location (e.g., that may include media errors) into an other memory location (e.g., that may be internal to the storage device) in the storage device to reconstruct the data (e.g., from the memory location that may include the corrupted data) from the peer drives (e.g., using the existing data).

In example embodiment, FIG. 3 illustrates the exploded view of the firmware 108. The timer module 300 may communicate with the track module 302 and the puncture module 312. The track module 302 may communicate with the release module 306. The locking module 304 may communicate with the expiration module 308 and the puncture module 312. The identification module 310 may communicate with the puncture module 312. The read module 314 may communicate with the reconstruction module 316 and the rebuild module 318. The rebuild module 318 may include the remap module 322. The rebuild module 318 may communicate with the write module 320. All the modules described herein may communicate with each other.

In one embodiment, the command timer 324 may be started when the firmware 108 accepts the command from the host. The amount of time the command spends on handling of the clustered media error 202 may be tracked through the command timer 324. The command timer 324 may be stopped when the command is completed and the time limit expires. The read may be completed as the success when the host IO is the read command. The write may be completed as the success, after writing parity and data when the host IO is the write command. When the logical volume may be in the optimal state and in partially degraded state, the requested data may be recovered using one peer drive when the read timer expires. The read may be completed as the failure when the command timer 324 expires. When the host IO may be the write command on the write through logical volume and when the command timer expires, the entire span of host write may be punctured on the parity drive, the host data on the data drive(s) may be written, and/or complete the may be completed as the success.

When the host IO may be the write command on the write back logical volume, the logical volume may be in the optimal state and partially degraded state, and when the command timer may expire, the dirty cache line may be kept as dirty and/or the clustered media error 202 currently accessed may be corrected until the dirty cache line may be flushed in the following flush cycle. When the host IO may be the write command on the write back logical volume, the logical volume may be in the completely degraded state, and when the command timer may expire, the entire span of host write may be punctured on the parity drive and/or the host data may be written on the data drive(s). When the logical volume may be the optimal state and/or the partially degraded state, the requested data may be recovered from one peer drive when the read timer may expire and the command timer 324 may be within the total threshold time including the read timer and/or the recovery timer, the strip 200 having the clustered media error 202 may be corrected, and the host read may be completed as the success.

The strip 200 may be read until the recovery time limit may expire even when the additional media error is encountered on the peer drive. The host read may be completed as the success when recovery completes successfully. When the logical volume may be in the completely degraded state, the host read may be failed if the time limit expires. The clustered media error 202 may be encountered while reading peer arms for generating the parity during the host write. It may be determined that the time limit for read has expired. When the logical volume may be the optimal state and/or the partially degraded state, and when the clustered media error 202 may be encountered for write command on the write through logical volume, the entire span of data on the strip 200 may be recovered by reading peer drives. The write may be completed through write command as the success.

Reading and recovery may be continued as much data as possible before the recovery timer expires if another media error is encountered on the peer drives. The unrecoverable portion of the strip 200 may be punctured having the clustered media error 202 and the host write may be completed as the success. The entire span of the strip 200 having the clustered media error 202 may be punctured if the command drive expires and the host write may be completed as the success.

The clustered media error 202 may be encountered while reading peer arms for generating the parity during the host write. It may be determined that the read timer has expired. When the logical volume may not be in the completely degraded state, and when the clustered media error 202 may be encountered for the write command on the write back logical volume, the entire span of data on the strip 200 may be recovered by reading peer drives. Reading and recovery may be continued as much data as possible before the command timer 324 may expire if another media error is encountered on the peer drives. When the command timer 324 expires, as many media errors as possible may be recovered and the dirty data may be maintained in the cache line and delayed write command may be reissued in the following flush cycle so that there will be the fewer number of media errors to recover from and success may occur on the next host write.

When the logical volume is in the completely degraded state, the entire portion of the strip 200 may be punctured including the clustered media error 202 and the write back write command may be completed as the success. The timer module 300 may start the command timer 324 when the firmware 108 accepts the command from the host. The track module 302 may track the amount of time the command spends on handling of a clustered media error 202 through the command timer 324. The expiration module 308 may stop the command timer 324 when the command is completed and the time limit expires.

The time limit of the command timer 324 may be the sum total of the time it takes to read the clustered media error 202 and another time to recover the media error by reading one peer drive. The command timer 324 may be used instead of the threshold number of clustered media errors because the command timer 324 addresses different recovery times of different drives. The command timer 324 may be started when the firmware 108 accepts the command from the host. The amount of time the command spends may be tracked on handling of the clustered media error 202 through the command timer. The command timer 324 may be stopped when the command is completed and the time limit expires.

Figure 4:
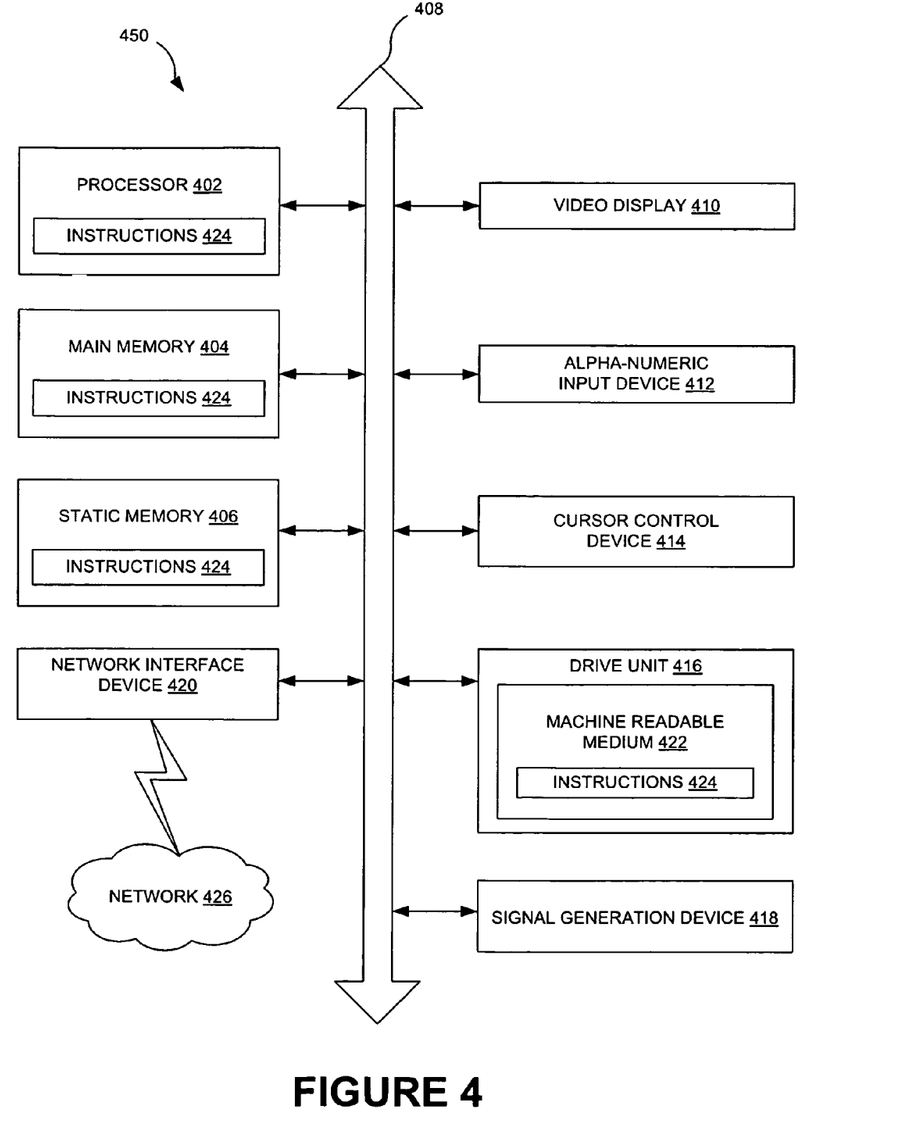
FIG. 4 is a diagrammatic representation of a data processing system capable of processing a set of instructions to perform any one or more of the methodologies herein, according to one embodiment.

FIG. 4 is a diagrammatic system view 400 of a data processing system in which any of the embodiments disclosed herein may be performed, according to on embodiment. Particularly, the diagrammatic system view 400 of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424, and a network 426, according to one embodiment.

The diagrammatic system view 400 may indicate a personal computer and/or the data processing system in which one or more operations disclosed herein are performed. The processor 402 may be a microprocessor, a state machine, an application specific integrated circuit, a field programmable gate array, etc. (e.g., Intel® Pentium® processor). The main memory 404 may be a dynamic random access memory and/or a primary memory of a computer system. The static memory 406 may be a hard drive, a flash drive, and/or other memory information associated with the data processing system. The bus 408 may be an interconnection between various circuits and/or structures of the data processing system. The video display 410 may provide graphical representation of information on the data processing system. The alpha-numeric input device 412 may be a keypad, a keyboard and/or any other input device of text (e.g., a special device to aid the physically handicapped).

The cursor control device 414 may be a pointing device such as a mouse. The drive unit 416 may be the hard drive, a storage system, and/or other longer term storage subsystem. The signal generation device 418 may be a bios and/or a functional operating system of the data processing system. The network interface device 420 may be a device that performs interface functions such as code conversion, protocol conversion and/or buffering required for communication to and from the network 426. The machine readable medium 422 may provide instructions on which any of the methods disclosed herein may be performed. The instructions 424 may provide source code and/or data code to the processor 402 to enable any one or more operations disclosed herein.

Figure 5A:
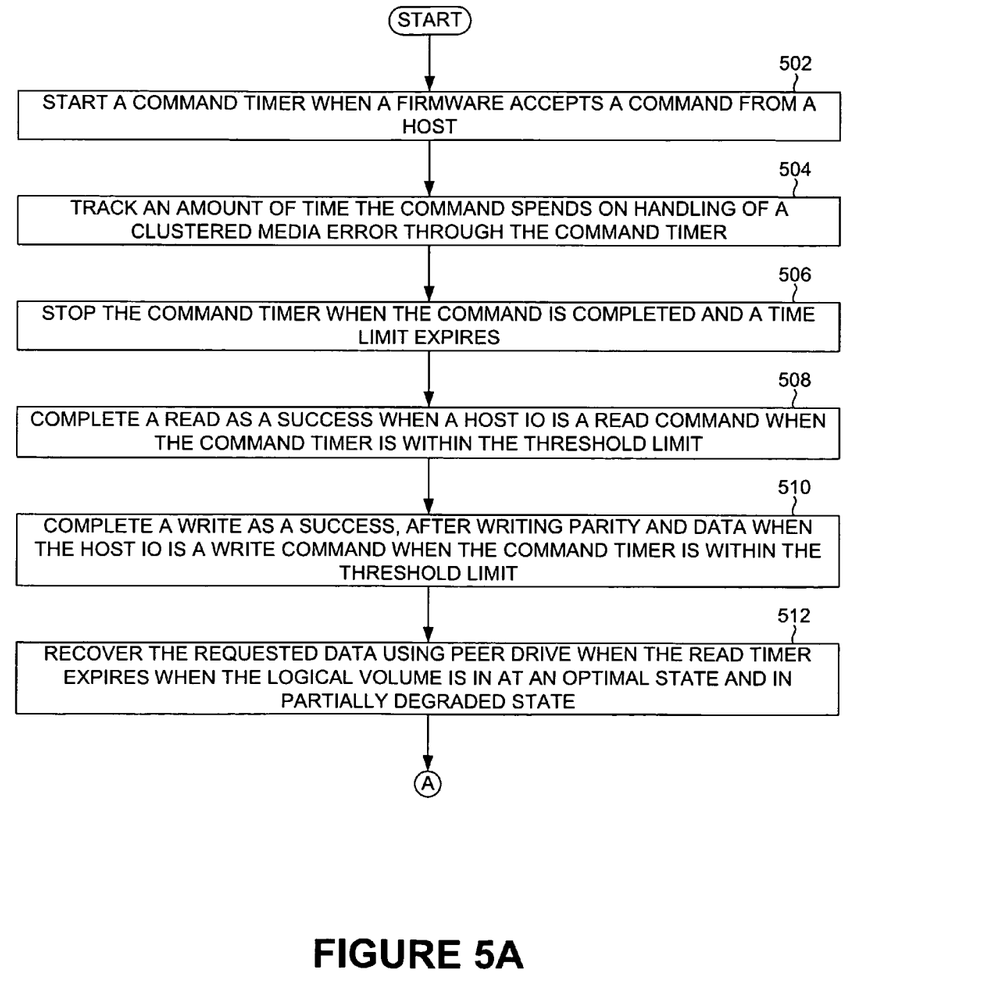
FIG. 5A is a process flow of starting the timer when the firmware accepts a command from a host, according to one embodiment.

FIG. 5A is a process flow of starting the command timer when the firmware 108 accepts a command from a host, according to one embodiment. In operation 502, a command timer (e.g., the command timer 324 of FIG. 3) may be started (e.g., using the timer module 300 of FIG. 3) when a firmware (e.g., the firmware 108 of FIG. 1) accepts a command from a host (e.g., using the timer module 300 of FIG. 3). In operation 504, an amount of time the command spends on handling of a clustered media error (e.g., the clustered media error 202 of FIG. 2) may be tracked through the command timer 324 (e.g., using the track module 302 of FIG. 3). In operation 506, the command timer 324 may be stopped when the command is completed and a time limit expires (e.g., using the expiration module 308 of FIG. 3).

The clustered media error 202 may occur when there are errors across a threshold number of contiguous blocks on a physical storage device such that a processing time for the clustered media error 202 exceeds a threshold timer. The time limit of the command timer 324 may be a sum total of a time it takes to read the clustered media error 202 and another time to recover the media error by reading peer drive. The command timer 324 may be used instead of a threshold number of clustered media errors because the command timer 324 addresses different recovery times of different drives. The command timer 324 may be a sum of a read timer and a recovery timer. When all drives are running, a logical volume may be in an optimal state. When less than all drives are running, the logical volume may be in a partially degraded state and/or a completely degraded state. When a logical volume may be in the optimal state, recovery for an I/O span may be started by reading a peer drive(s) on an affected strip and then the strip 200 having the clustered media error 202 may be corrected.

In operation 508, a read may be completed as a success when a host IO is a read command when the command timer 324 is within the threshold limit. In operation 510, a write may be completed as a success, after writing parity and data when the host IO is a write command when the command timer is within the threshold limit. In operation 512, when the logical volume may be in an optimal state and/or in partially degraded state, the requested data may be recovered using one peer drive when the read time expires.

Figure 5B:
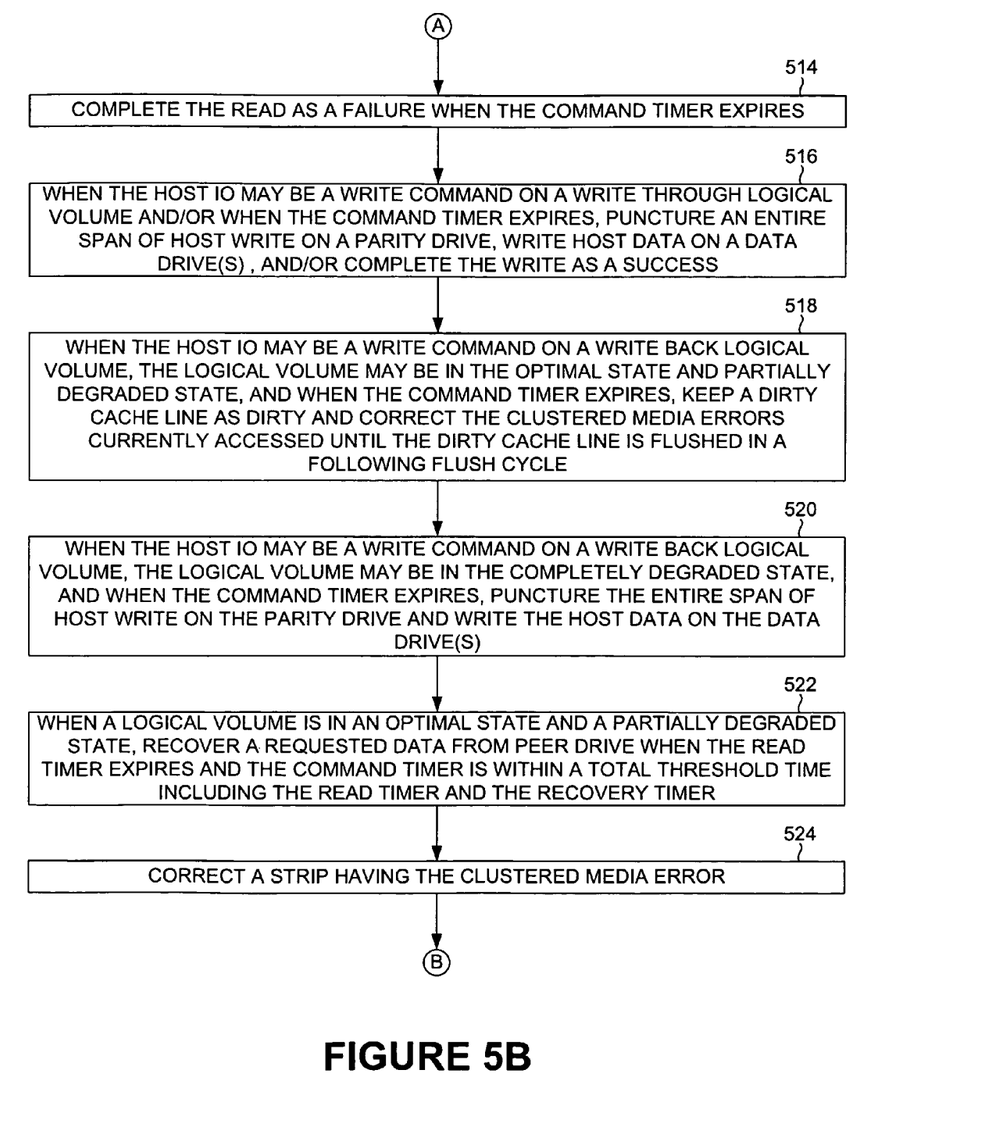
FIG. 5B is a continuation of process flow of FIG. 5A, illustrating additional operations, according to one embodiment.

FIG. 5B is a continuation of process flow of FIG. 5A, illustrating additional operations, according to one embodiment. In operation 514, the read as a failure may be completed when the command timer 324 expires. In operation 516, when the host IO may be a write command on a write through logical volume and when the command timer expires, an entire span of host write may be punctured on a parity drive, write a host data may be written on a data drive(s), and/or the write may be completed as a success. In operation 518, when the host IO may be a write command on a write back logical volume, the logical volume may be in the optimal state and/or partially degraded state, and when the command timer may expire, a dirty cache line may be kept as dirty and/or the clustered media errors currently accessed may be corrected until the dirty cache line may be flushed in a following flush cycle.

In operation 520, when the host IO may be a write command on a write back logical volume, the logical volume may be in the completely degraded state, and when the command timer may expire, the entire span of host write may be punctured on the parity drive and/or the host data may be written on the data drive(s). In operation 522, when a logical volume may be an optimal state and/or a partially degraded state, a requested data may be recovered from one peer drive when the read timer expires and the command timer 324 may be within a total threshold time including the read timer and/or the recovery timer. In operation 524, the strip 204 having the clustered media error 202 may be corrected. In operation 526, the host read may be completed as a success.

Figure 5C:
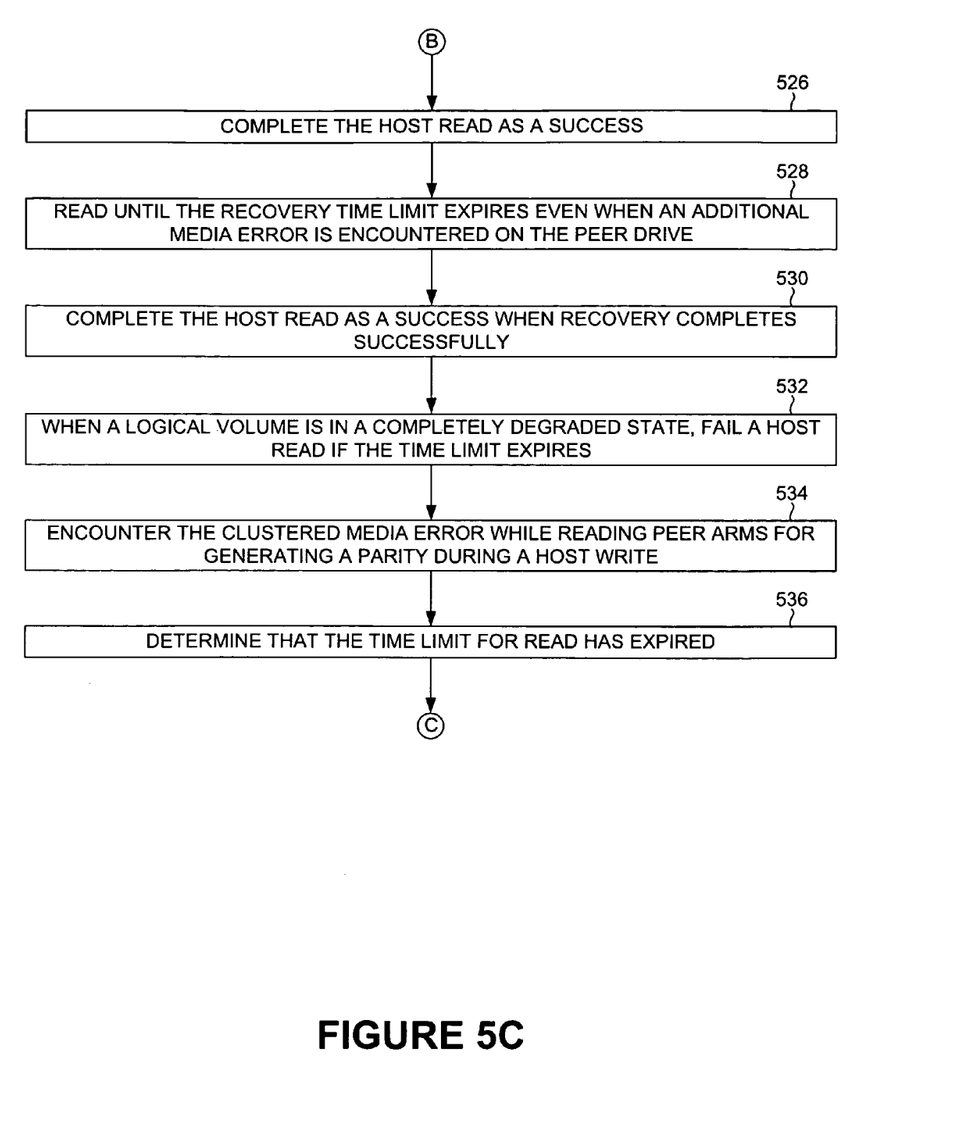
FIG. 5C is a continuation of process flow of FIG. 5B, illustrating additional operations, according to one embodiment.

FIG. 5C is a continuation of process flow of FIG. 5B, illustrating additional operations, according to one embodiment. In operation 528, the strip 204 may be read until the recovery time limit expires even when an additional media error is encountered on the peer drive. In operation 530, the host read may be completed as a success when recovery completes successfully. In operation 532, when a logical volume may be in a completely degraded state, a host read may be failed if the time limit expires.

In operation 534, the clustered media error 202 may be encountered while reading peer arms for generating a parity during a host write. In operation 536, it may be determined that the time limit for read has expired. In operation 538, when a logical volume may be an optimal state and/or a partially degraded state, and when a clustered media error may be encountered for write command on a write through logical volume, an entire span of data may be recovered on the strip 200 by reading peer drives.

Figure 5D:
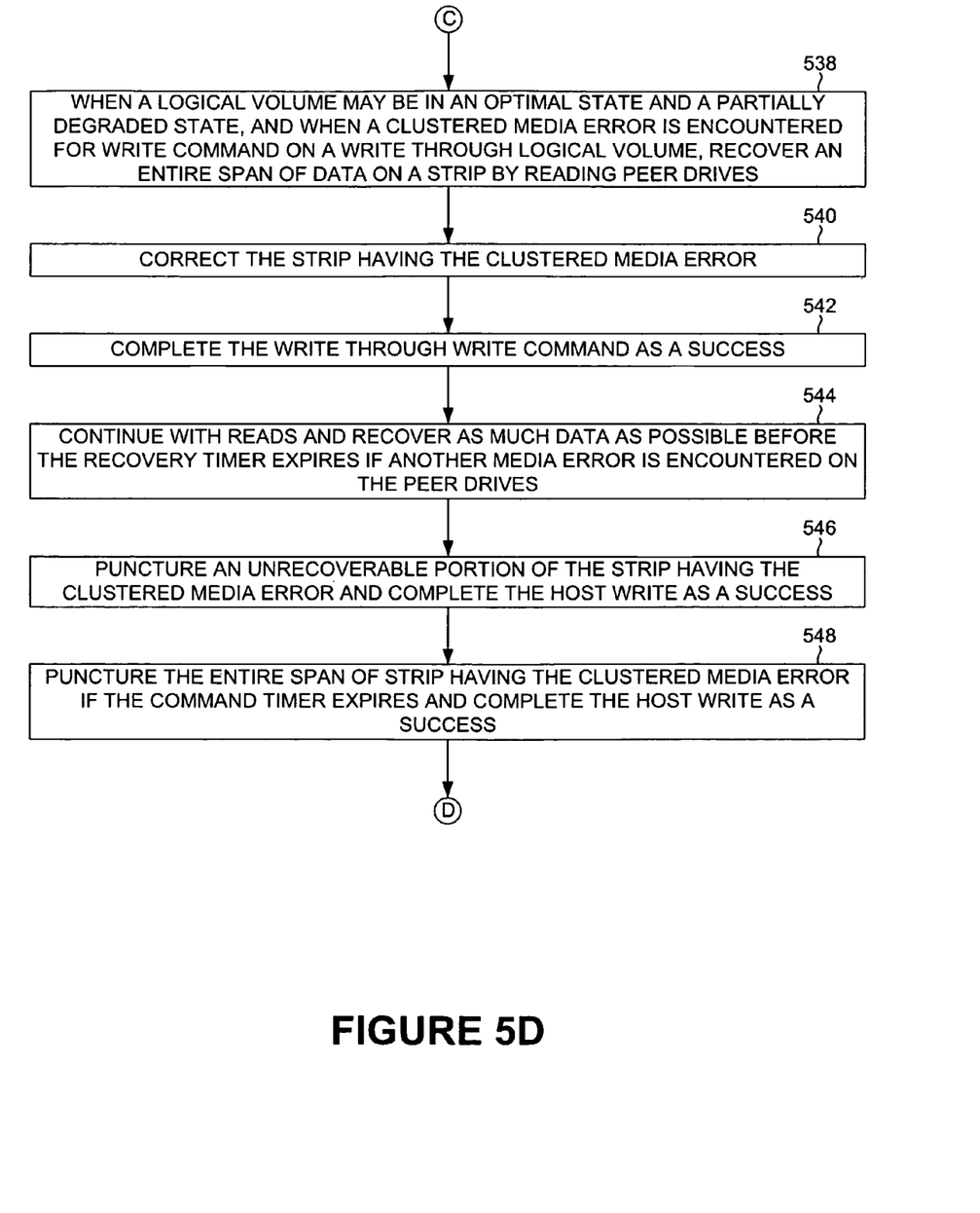
FIG. 5D is a continuation of process flow of FIG. 5C, illustrating additional operations, according to one embodiment.

FIG. 5D is a continuation of process flow of FIG. 5C, illustrating additional operations, according to one embodiment. In operation 540, the strip 200 having the clustered media error 202 may be corrected. In operation 542, the write may be completed through write command as a success. In operation 544, reading and recovering as much data as possible may be continued before the recovery timer may expire if another media error may be encountered on the peer drives. In operation 546, an unrecoverable portion of the strip 200 may be punctured having the clustered media error 202 and the host write may be completed as a success. In operation 548, the entire span of strip 200 having the clustered media error 202 may be punctured if the command timer expires and the host write may be completed as a success. In operation 550, the clustered media error 202 may be encountered while reading peer arms for generating a parity during a host write.

Figure 5E:
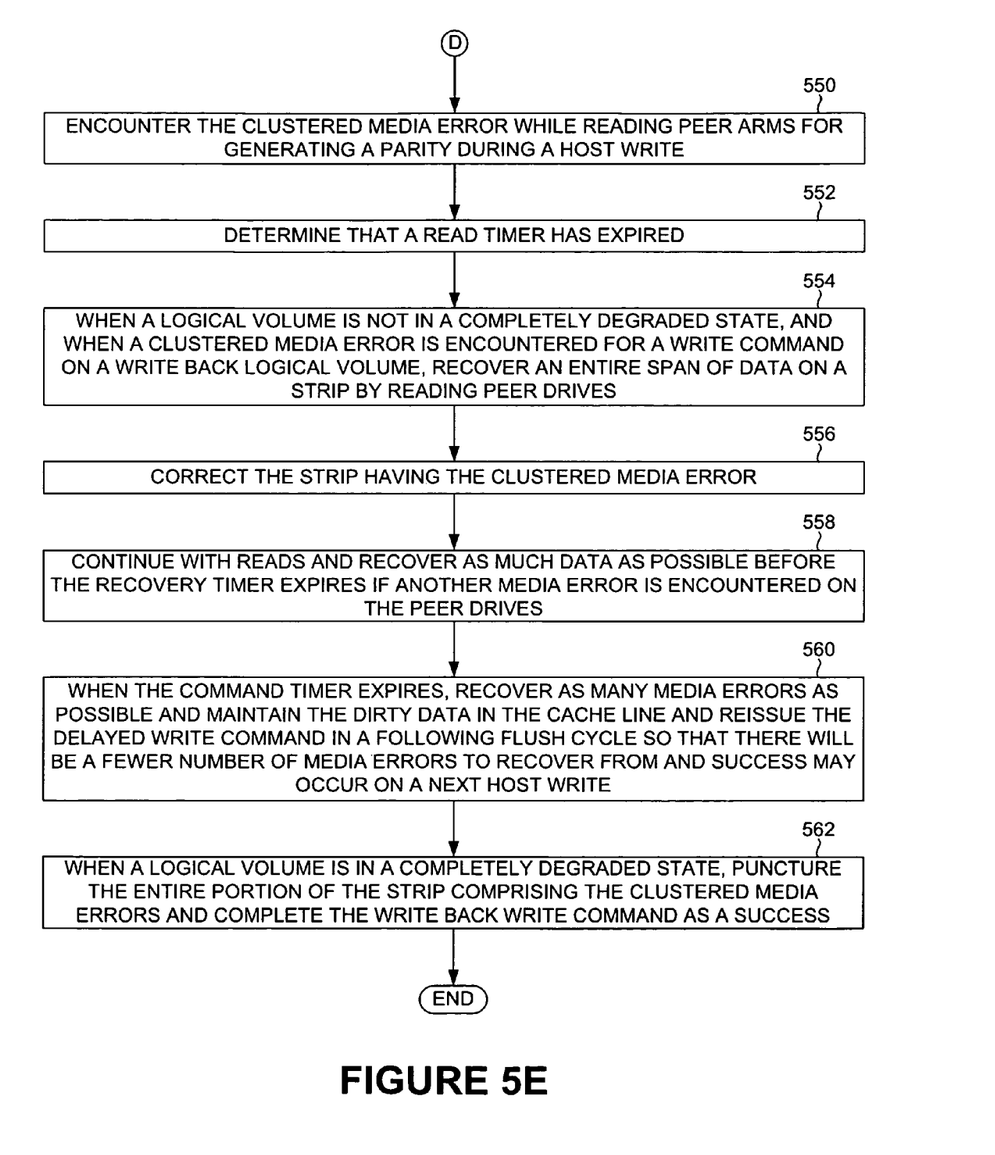
FIG. 5E is a continuation of process flow of FIG. 5D, illustrating additional operations, according to one embodiment.

FIG. 5E is a continuation of process flow of FIG. 5D, illustrating additional operations, according to one embodiment. In operation 552, it may be determined that a read timer has expired. In operation 554, when a logical volume may not be in a completely degraded state, and when the clustered media error 202 may be encountered for a write command on a write back logical volume, an entire span of data may be recovered on the strip 200 by reading peer drives. In operation 556, the strip 200 having the clustered media error 202 may be corrected. In operation 558, reading and recovery may be continued as much data as possible before the recovery timer expires if another media error is encountered on the peer drives.

In operation 560, when the command timer 324 may expire, as many media errors may be recovered as possible and the dirty data may be maintained in the cache line and delayed write command may be reissued in a following flush cycle so that there will be a fewer number of media errors to recover from and success may occur on a next host write. In operation 562, when a logical volume may be in a completely degraded state, the entire portion of the clustered media strip may be punctured and the write back write command may be completed as a success.

Figure 6:
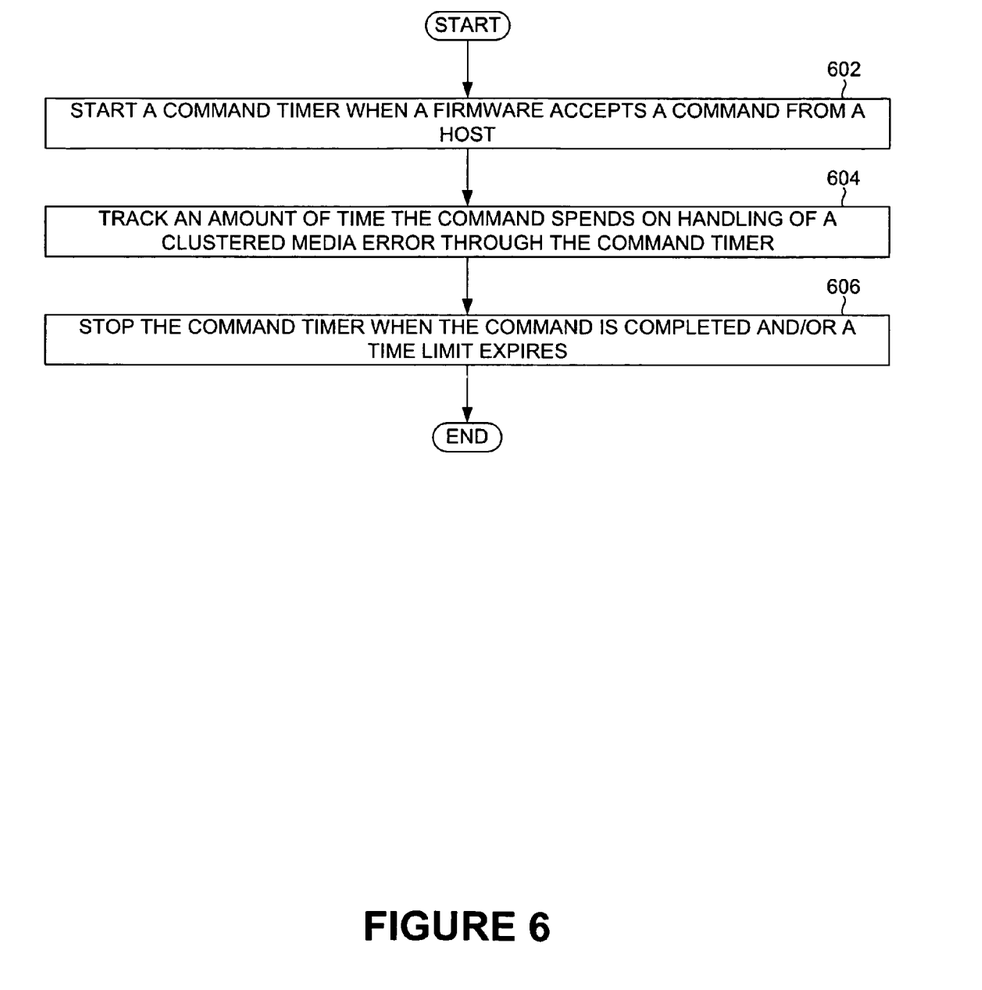
FIG. 6 is a process flow of stopping the command timer when the command is completed and a time limit expires, according to one embodiment.

FIG. 6 is a process flow of stopping the command timer 324 when the command is completed and a time limit expires, according to one embodiment. In operation 602, a command timer (e.g., the command timer 324 of FIG. 3) may be started (e.g., using the timer module 300 of FIG. 3) when a firmware (e.g., the firmware 108 of FIG. 1) accepts a command from a host (e.g., using the timer module 300 of FIG. 3). In operation 604, an amount of time the command spends on handling of a clustered media error (e.g., the clustered media error 202 of FIG. 2) may be tracked through the command timer 324 (e.g., using the track module 302 of FIG. 3). In operation 606, the command timer 324 may be stopped (e.g., using the timer module 300 of FIG. 3) when the command may be completed and a time limit expires (e.g., using the expiration module 308 of FIG. 3).

The clustered media error 202 may occur when there are errors across a number of contiguous blocks on a physical storage device (e.g., may be the storage device 110A-N of FIG. 1). The time limit of the command timer 324 may be a sum total of a time it takes to read the clustered media error 202 and another time to recover the media error by reading one peer drive (e.g., using the read module 314 of FIG. 3).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the timer module 300, the track module 302, the locking module 304, the release module 306, the expiration module 308, the identification module 310, the puncture module 312, the read module 314, the reconstruction module 316, the rebuild module 318, the write module 320, and the remap module 322 of FIG. 1-6 may be enabled using software and/or using transistors, logic gates, and electrical circuits (e.g., application specific integrated ASIC circuitry) such as a timer circuit, a track circuit, a locking circuit, a release circuit, an expiration circuit, an identification circuit, a puncture circuit, a read circuit, a reconstruction circuit, a rebuild circuit, a write circuit, and a remap circuit, and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising: tracking an amount of time a command spends on handling a clustered media error associated with a physical storage device through a command timer, the clustered media error being an error across a number of contiguous blocks on the physical storage device such that a processing time associated therewith exceeds a threshold timer; and stopping the command timer when at least one of the command is completed and a time limit expires.

2. The method of claim 1, further comprising starting the command timer when a firmware accepts the command from a host.

3. The method of claim 1, wherein the time limit of the command timer is a sum total of a time taken to read the clustered media error and another time to recover the clustered media error by reading at least one peer drive.

4. The method of claim 3, wherein the command timer is used instead of a threshold number of clustered media errors to address different recovery times of different drives.

5. The method of claim 1,
wherein the command timer is a sum of a read timer and a recovery timer,
wherein when all drives are running, a logical volume associated with the physical storage device is in an optimal state, and
wherein when less than all drives are running, the logical volume is in at least one of a partially degraded state and a completely degraded state.

6. The method of claim 5, wherein when the logical volume is in the optimal state, recovery is startedfor an I/O span by reading a peer drive(s) on an affected strip and then correcting the strip having the clustered media error.

7. The method of claim 1, further comprising at least one of:
completing a read as a success when a host I/O is a read command when the command timer is within a threshold limit; and
completing a write as a success, after writing parity and data when the host IO is a write command when the command timer is within the threshold limit.

8. The method of claim 5,
wherein when the logical volume is in at least one of the optimal state and the partially degraded state, a requested data is recovered using at least one peer drive when the read timer expires.

9. The method of claim 7, further comprising:
completing the read as a failure when the command timer expires,
wherein when the host I/O is a write command on a write through logical volume and when the command timer expires, an entire span of host write is punctured on a parity drive, host data is written on a data drive, and the write is completed as a success,
wherein when the host IO is a write command on a write back logical volume, the logical volume is in at least one of an optimal state and a partially degraded state, and when the command timer expires, a dirty cache line is kept as dirty and the clustered media errors currently accessed are corrected until the dirty cache line is flushed in a following flush cycle, and
wherein when the host I/O is a write command on the write back logical volume, the logical volume is in a completely degraded state, and when the command timer expires, the entire span of host write is punctured on the parity drive and the host data is written on the data drive.

10. The method of claim 1, further comprising:
recovering, when a logical volume is at least one of in an optimal state and a partially degraded state, a requested data from at least one peer drive when the read timer expires and the command timer is within a total threshold time including the read timer and the recovery timer;
correcting a strip having the clustered media error;
completing the host read as a success;
reading until the recovery time limit expires even when an additional media error is encountered on the at least one peer drive; and
completing the host read as a success when recovery completes successfully.

11. The method of claim 9, further comprising:
failing a host read if the time limit expires when a logical volume associated with the physical storage device is in a completely degraded state.

12. The method of claim 1, further comprising:
encountering the clustered media error while reading peer arms for generating a parity during a host write;
determining that the time limit for read has expired;
recovering an entire span of data on a strip by reading peer drives when a logical volume is at least one of in an optimal state and a partially degraded state, and when the clustered media error is encountered for a write command on a write through logical volume;
correcting the strip having the clustered media error;
completing the write through write command as a success;
continuing with reads and recovering as much data as possible before the recovery timer expires if another media error is encountered on the peer drives;
puncturing an unrecoverable portion of the strip having the clustered media error and completing the host write as a success; and
puncturing the entire span of the strip having the clustered media error if the command timer expires and completing the host write as a success.

13. The method of claim 1, further comprising:
encountering the clustered media error while reading peer arms for generating a parity during a host write;
determining that a read timer has expired;
recovering an entire span of data on a strip by reading peer drives when a logical volume associated with the physical storage device is not in a completely degraded state, and when the clustered media error is encountered for a write command on a write back logical volume;
correcting the strip having the clustered media error;
continuing with reads and recover as much data as possible before the recovery timer expires if another media error is encountered on the peer drives; and
when the command timer expires, recovering as many media errors as possible and maintaining a dirty data in a cache line and reissuing a delayed write command in a following flush cycle so that there will be a fewer number of media errors to recover from and success occurs on a next host write.

14. The method of claim 12, further comprising:
puncturing an entire portion of the strip comprising the clustered media errors and completing the write back write command as a success when the logical volume is in a completely degraded state.

15. A system comprising: a storage device, said storage device comprising: a track module to track an amount of time a command spends on handling a clustered media error associated with a physical storage device through a command timer, the clustered media error being an error across a number of contiguous blocks on the physical storage device such that a processing time associated therewith exceeds a threshold timer; and an expiration module to stop the command timer when at least one of the command is completed and a time limit expires.

16. The system of claim 15, further comprising a track module to start the command timer when a firmware accepts the command from a host.

17. The system of claim 15, wherein the time limit of the command timer is a sum total of a time taken to read the clustered media error and another time to recover the clustered media error by reading at least one peer drive.

18. The system of claim 16, wherein the command timer is used instead of a threshold number of clustered media errors to address different recovery times of different drives.

19. A storage system comprising:
- a client device;
- a storage device;
- a server to service an I/O request from the client device, the I/O request being associated with storage data on the storage device; and
- a firmware associated with the server, the firmware having a tracking module implemented therein to track an amount of time a command associated with the I/O request spends on handling a clustered media error associated with the storage device and an expiration module implemented therein to stop the tracking when at least one of: the command is completed and a time limit expires, the clustered media error being an error across a number of contiguous blocks on the storage device such that a processing time associated therewith exceeds a threshold timer.

20. The storage system of claim 19, wherein the tracking module tracks the amount of time the command spends on handling the clustered media error upon the firmware accepting the command from the client device.

* * * * *